(12) United States Patent
Schwemmer et al.

(10) Patent No.: US 10,753,877 B1
(45) Date of Patent: Aug. 25, 2020

(54) OPTICAL MICROCAVITIES WITH INTEGRATED ELECTROSTATIC CONFINEMENT AND BROWNIAN MOTORS

(71) Applicant: International Business Machines Corporation, Armonk, NY (US)

(72) Inventors: Christian Michael Schwemmer, Zurich (CH); Darius Urbonas, Adliswil (CH); Francesca Ruggeri, Zurich (CH); Thilo Hermann Curt Stoeferle, Rueschlikon (CH); Armin Knoll, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/407,372

(22) Filed: May 9, 2019

(51) Int. Cl.
*G01J 3/44* (2006.01)
*G01N 21/65* (2006.01)
*G01N 15/14* (2006.01)

(52) U.S. Cl.
CPC ....... *G01N 21/658* (2013.01); *G01N 15/1404* (2013.01); *G01N 15/1434* (2013.01); *G01N 15/1484* (2013.01)

(58) Field of Classification Search
CPC ... G01J 3/44; G01J 3/02; G01N 21/65; G01N 21/658; G01N 2021/656
USPC ......................................................... 356/301
See application file for complete search history.

(56) References Cited

U.S. PATENT DOCUMENTS

| | | | |
|---|---|---|---|
| 8,937,763 B2 | 1/2015 | Ding et al. | |
| 9,057,825 B2 | 6/2015 | Erickson et al. | |
| 9,739,770 B2 | 8/2017 | Su | |
| 9,927,458 B2* | 3/2018 | Bramhavar | G01P 15/093 |
| 2005/0017313 A1* | 1/2005 | Wan | B81C 1/00095 |
| | | | 257/415 |
| 2010/0238454 A1* | 9/2010 | Pruessner | G01G 3/165 |
| | | | 356/479 |

FOREIGN PATENT DOCUMENTS

WO   2018/005044 A1   1/2018

OTHER PUBLICATIONS

Li, Z., et al., "Highly Sensitive Label-Free Detection of Small Molecules with an Optofluidic Microbubble Resonator", Micromachines 2018, Accepted May 29, 2018, Published May 31, 2018, 9 pages, vol. 9, Issue 6.

(Continued)

*Primary Examiner* — Md M Rahman
(74) *Attorney, Agent, or Firm* — Scully, Scott, Murphy & Presser, P.C.; Daniel P. Morris

(57) ABSTRACT

A detection device can include a cavity structure forming a Fabry-Perot optical microcavity, an electrostatic trap, and a Brownian motor. The Fabry-Perot optical microcavity has two mirrors extending on each side of a reference plane in a spacer region between the two mirrors. The mirrors are configured to vertically confine radiation in the spacer region, e.g., with respect to a first direction perpendicular to the reference plane. The electrostatic trap is arranged in the spacer region. The trap includes a pit and the cavity structure is generally configured to confine radiation in the pit, laterally (e.g., with respect to a second direction parallel to the reference plane). The Brownian motor structure extends in the spacer region along said reference plane. This structure is adapted to laterally load particles in the pit of the electrostatic trap by moving such particles along the structure, in operation.

20 Claims, 5 Drawing Sheets

(56) References Cited

OTHER PUBLICATIONS

Krishnan, M., et al., "Geometry-induced electrostatic trapping of nanometric objects in a fluid", Nature, Oct. 7, 2010, pp. 692-696, vol. 467.

Wang, Q., et al., "An Adaptive Anti-Brownian Electrokinetic Trap with Real-Time Information on Single-Molecule Diffusivity and Mobility", American Chemical Society 2011, Accepted and Published online May 25, 2011, pp. 5792-5799, vol. 5, No. 7.

Mandal, S., et al., "Nanomanipulation Using Silicon Photonic Crystal Resonators", NANO Letters 2010, Published for review Sep. 4, 2009, Published on Web Dec. 2, 2009, pp. 99-104, vol. 10.

Lin, S., et al., "Optical Manipulation with Planar Silicon Microring Resonators", NANO Letters 2010, Published for review Feb. 10, 2010, Published on Web Jun. 14, 2010, pp. 2408-2411, vol. 10.

Hummer, T., et al., "Cavity-enhanced Raman microscopy of individual carbon nanotubes", Nature Communications, Accepted Jun. 7, 2016, Published Jul. 12, 2016, 7 pages, 7:12155.

Petrak, B., et al., "Purcell-enhanced Raman scattering from atmospheric gases in a high-finesse microcavity", Physical Review A 89, Feb. 2014, pp. 023811-1-023811-6, vol. 89, Issue 2.

Wu, M., et al., "Stable optical trapping and sensitive characterization of nanostructures using standing-wave Raman tweezers", Scientific Reports, 8 pages, vol. 7, Article No. 42930.

Ding, F., et al., "Vertical microcavities with high Q and strong lateral mode confinement", Physical Review B 87, Apr. 2013, pp. 161116-1-161116-5, vol. 87, Issue 16.

Ruggeri, F., et al., "Entropic Trapping of a Singly Charged Molecule in Solution", Nano Letters 2018, Revised Apr. 18, 2018, Published Apr. 24, 2018, pp. 3773-3779, vol. 18.

Ruggeri, F., .et al., "Single-molecule electrometry", Nature Nanotechnology, Published online Mar. 13, 2017, May 2017, pp. 488-495, vol. 12.

* cited by examiner

OPTICAL MICROCAVITIES WITH INTEGRATED ELECTROSTATIC CONFINEMENT AND BROWNIAN MOTORS

BACKGROUND

The present disclosure relates in general to the fields of optical microcavities, Brownian motors, electrostatic traps, particles detection, in particular the characterization of such particles, e.g., using Raman spectroscopy and related spectroscopy techniques.

Optical microcavities are known to confine light to a small volume. Devices using optical microcavities are today essential in many fields, ranging from optoelectronics to quantum information. Typical applications are long-distance data transmission over optical fibers, optical sensing and read/write laser beams in DVD/CD players. A variety of confining semiconductor microstructures have been developed and studied, involving various geometrical and resonant properties. A microcavity has smaller dimensions than a conventional optical cavity; it is often only a few micrometers thick and the individual layers that it comprises can even reach the nanometer range.

An optical cavity forms an optical resonator, which allows, in case of a Fabry-Perot geometry, a standing wave to form inside the central layer between the two mirrors. The thickness of the latter determines the cavity mode, which corresponds to the wavelength that can be transmitted and forms as a standing wave inside the resonator.

An optical resonator typically comprises a vertically layered stack of different materials and/or structures on a substrate that realizes two mirrors to confine the light in the vertical direction. Lateral confinement of the light is usually achieved by locally modulating the refractive index of the mirrors or the volume between them.

Various types of nanoparticle sensors have been proposed. For example, sensors are known, which involve plasmonic antennas (typically a pair of antenna elements), where the antennas define a hot spot volume (the active area between the antenna elements) in which particles must be brought to perform detection. Nanoparticle sensors are used for a range of applications, such as, e.g., the detection of pathogens, the surveillance of industrial processes, or environmental monitoring. Ideally, a nanoparticle sensor should be label-free, as labeling is specific and the label itself interferes with the assay and changes it properties.

For detection, a nanoparticle must be transported and trapped in the active area of the sensor. If the transport depends on diffusion only, the time required for a particle to diffuse to the detector becomes a limiting factor, especially at low concentrations. Detachment of the particles from the active area can further be an issue. If the transport is instead driven by a fluid flow, the fluid must be injected into the sensing area. This may require relatively high fluid pressures, which is difficult to handle. Moreover, particles may clog in the inlet channel, the outlet channel, and/or the sensing area.

SUMMARY

According to a first aspect, the present invention is embodied as a detection device, which includes a cavity structure. The latter forms, together, a Fabry-Perot optical microcavity, an electrostatic trap, and a Brownian motor. The Fabry-Perot optical microcavity has two mirrors extending on each side of a reference plane in a spacer region between the two mirrors. The mirrors are configured to vertically confine radiation in the spacer region, i.e., with respect to a first direction perpendicular to the reference plane. The electrostatic trap is arranged in the spacer region. The trap includes a pit. The cavity structure is otherwise configured to confine radiation in the pit, laterally (i.e., with respect to a second direction parallel to the reference plane). Moreover, the Brownian motor structure extends in the spacer region along said reference plane. This Brownian motor structure is used to laterally load particles in the pit of the electrostatic trap, by moving such particles along the Brownian motor structure, in operation of the device.

According to another aspect, the invention is embodied as a detection apparatus, which includes a device such as described above. The apparatus otherwise comprises a radiation source configured to irradiate the microcavity, so as to allow a standing wave to form in the spacer region, as well as a detector configured to detect optical properties of particles trapped in the electrostatic trap.

According to a final aspect, the invention is embodied as a particle detection method. The method again relies on a device such as described above. According to this method, one or more particles are loaded in the electrostatic trap (by moving such particles along the Brownian motor structure of the device), and optical properties of particles trapped in the electrostatic trap are detected by irradiating the microcavity to concentrate radiation at the level of the pit of the trap.

Devices, apparatuses, and methods embodying the present invention will now be described, by way of non-limiting examples, and in reference to the accompanying drawings.

BRIEF DESCRIPTION OF THE DRAWINGS

The accompanying figures, where like reference numerals refer to identical or functionally similar elements throughout the separate views, and which together with the detailed description below are incorporated in and form part of the present specification, serve to further illustrate various embodiments and to explain various principles and advantages all in accordance with the present disclosure, in which.

Figure 1:
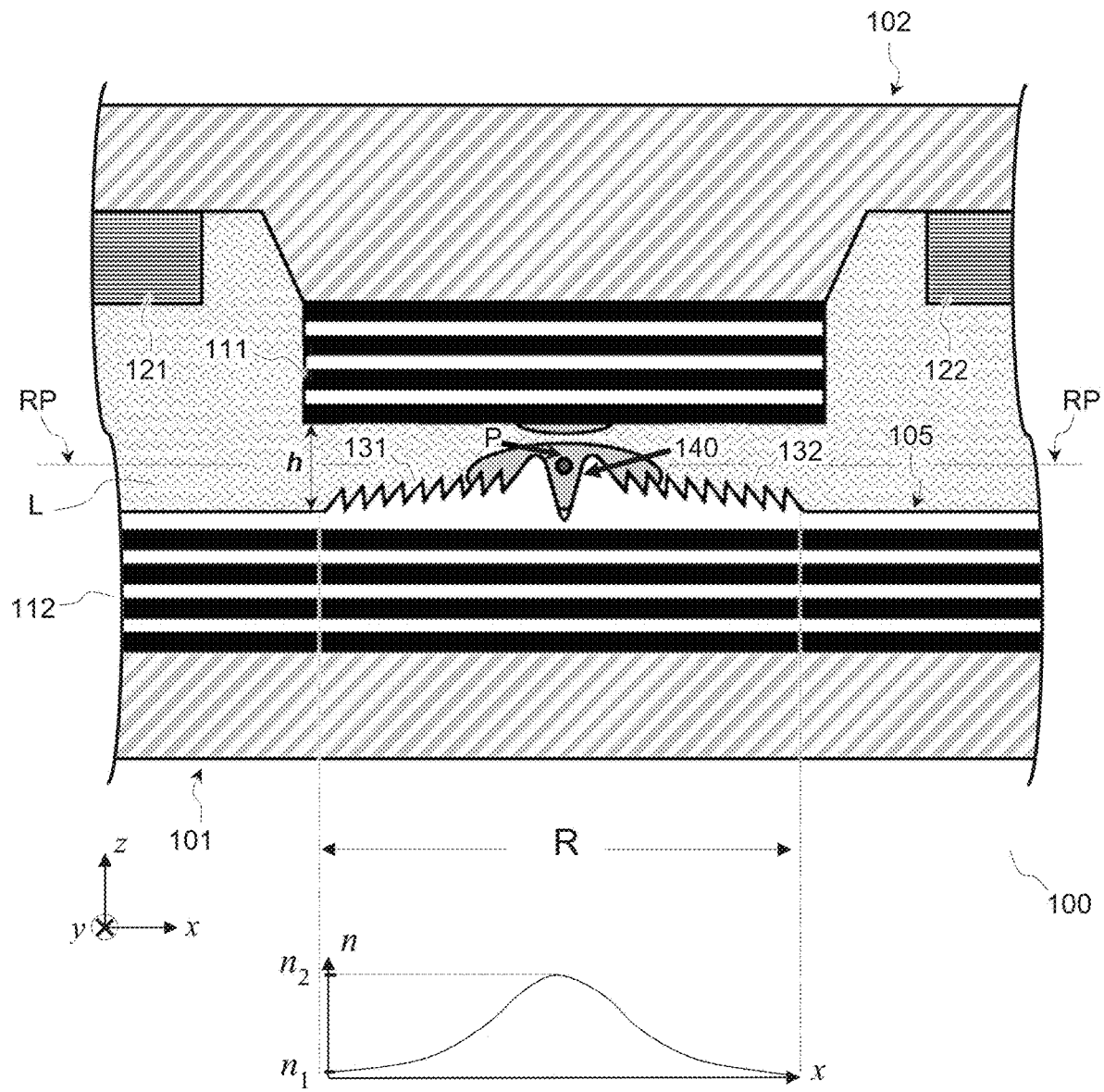
FIG. 1 is a 2-dimensional (2D) cross-sectional view of a detection device, including a microcavity with a Brownian motor structure and an electrostatic trap, according to embodiments.

The accompanying drawings show simplified representations of devices or parts thereof, as involved in embodiments. Technical features depicted in the drawings are not necessarily to scale. Similar or functionally similar elements in the figures have been allocated the same numeral references, unless otherwise indicated.

DETAILED DESCRIPTION

The following description is structured as follows. First, general embodiments and high-level variants are described (sect. 1). The next section addresses more specific embodiments and technical implementation details (sect. 2).

1. General Embodiments and High-Level Variants

In reference to FIGS. 1, 2, 4, and 5, an aspect of the invention is first described, which concerns a detection device 100.

As seen in FIG. 1, the device 100 includes a cavity structure, which together forms a Fabry-Perot optical microcavity, an electrostatic trap, and a Brownian motor.

The cavity includes two mirrors 111, 112 that extend on each side of a reference plane RP. This plane RP is parallel to the plane (x, y), see FIG. 1, and extends in a spacer region R between the two mirrors 111, 112. In FIG. 1, the plane RP is located at a same distance from the inner surfaces (the frontmost surfaces) of the mirrors 111, 112. Inner surfaces of the mirrors are normally parallel to the plane RP. The mirrors are configured to vertically confine radiation in the spacer region R. In the accompanying drawings, the vertical axis corresponds to the axis z, whose direction is perpendicular to the reference plane RP.

Next, the cavity structure further forms an electrostatic trap 140 in the spacer region R. The trap includes a central, trapping structure 141, 142 and is complementarily formed by surfaces of the cavity, including surfaces of the optical microcavity, for example the inner surfaces of the mirrors 111, 112, as discussed later in detail. The trap 140 can accordingly be regarded as forming part of the cavity structure, together with the optical microcavity. As seen in FIGS. 1, 4A-D, and 5A-D, the trap 140 notably includes a pit 141, i.e., a defect that is formed by surfaces of the cavity structure. The cavity structure is otherwise designed so as to laterally confine radiation at the level of the pit 141. Note, the lateral confinement refers to a direction parallel to the reference plane RP and may be appreciated with respect to any direction a $\hat{x}$+b $\hat{y}$ in that plane.

Moreover, the cavity structure also forms a Brownian motor structure 131-134, which extends in the spacer region R, along the reference plane RP. This Brownian motor structure 131-134 is designed so as to be able to laterally load particles P in the pit 141 of the electrostatic trap 140, i.e., by moving particles along the Brownian motor structure 131-134, in operation of the device 100.

The microcavity (including mirrors) will typically be a few micrometers thick. The mirrors are preferably formed as distributed Bragg reflectors (DBRs), whose individual layers may have a thickness in the hundreds of nanometer range. As known per se, DBRs form vertically layered stacks of different materials and/or structures that realize two mirrors to confine the light in the vertical direction. In all cases, the mirrors 111, 112 form an optical resonator, which allow for a standing wave to form inside the central layer between the two mirrors.

Figure 4A:
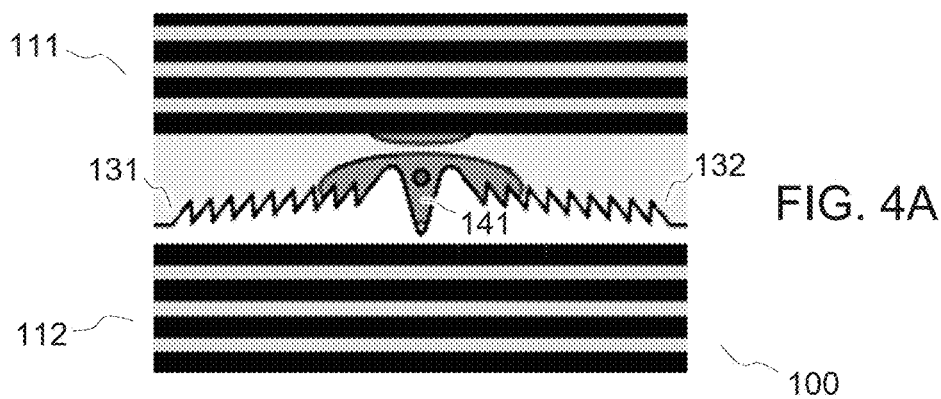
FIGS. 4A-4D and 5A-5D are further cross-sectional views of detection devices such as depicted in FIG. 1 (FIGS. 4A, 5A, and 5B), or variants thereto (FIGS. 4B-4D, 5C, and 5D), illustrating how radiation can be confined at the level of the electrostatic trap to detect properties of trapped particles, according to various spectroscopy techniques, as in embodiments.
Figure 4B:
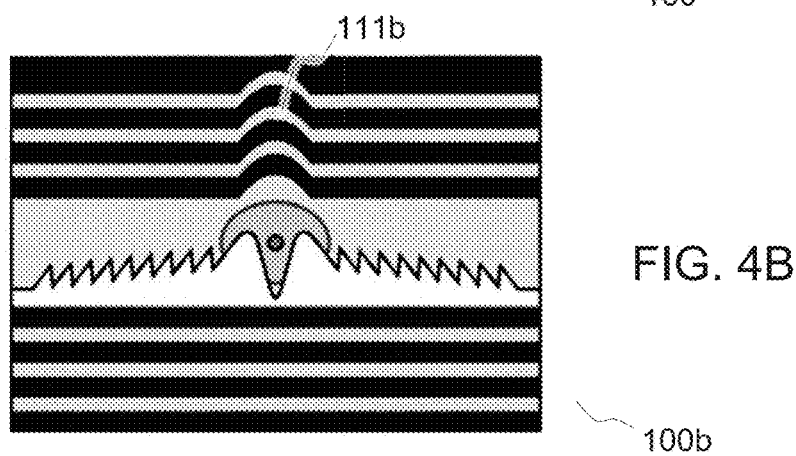
Figure 4C:
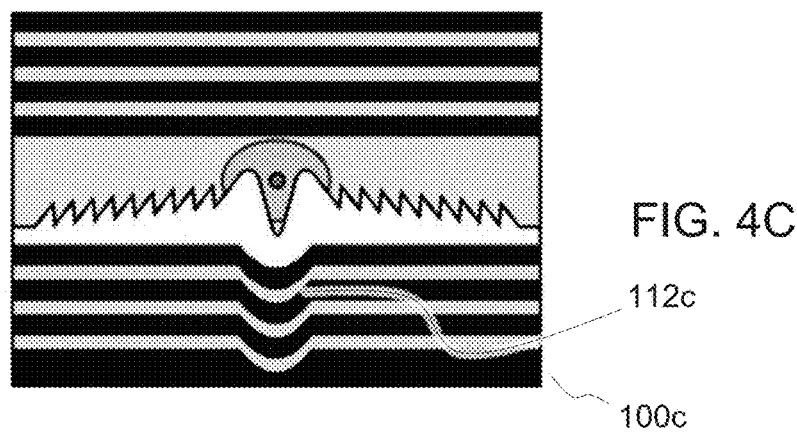
Figure 4D:
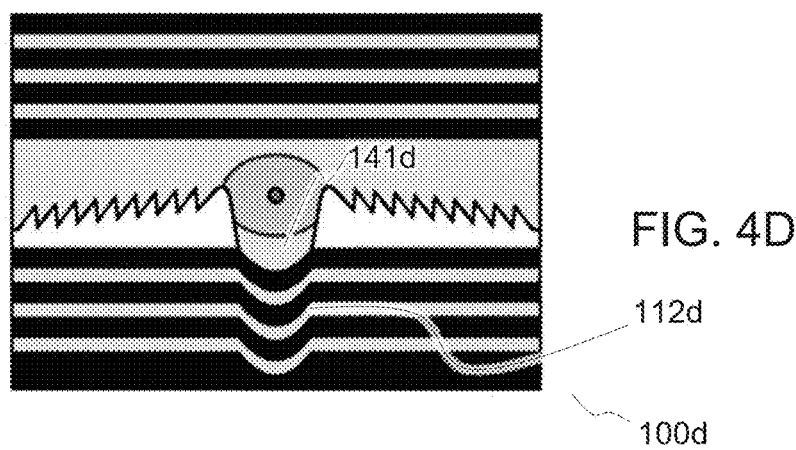

In the present case, the lateral confinement of radiation is achieved by locally modulating the effective refractive index of the volume between the mirrors (see FIG. 1), although a defect may be introduced in the mirrors themselves, as illustrated in FIGS. 4B-4D. Thus, the cavity structure is globally configured so as to allow confinement of radiation both in the direction of the normal to the reference plane RP and parallel to this plane, thanks to the optical microcavity and trap 140 that it forms.

As described above, the device 100 together integrates an optical microcavity, an electrostatic confinement, and a Brownian motor in a same cavity structure. This device may notably be embodied as a nanosensor, which allows particles to be reversibly loaded into the electrostatic trap 140 inside the optical microcavity, where particles can then be spectroscopically analyzed for an extended time period with high sensitivity and specificity. To that aim, the cavity structure is designed to allow local radiation confinement at the level of the trap. A "confinement" of radiation means that higher radiation intensities will be achieved in the volume defined by the trap cavity (i.e., the pit 141). That is, highest electromagnetic intensities are concentrated at the level of the pit 141, where particles P get trapped. To that aim, the pit 141 will have a subwavelength lateral dimension. I.e., the average lateral dimension of the pit in the plane (x, y) is chosen with respect to wavelengths intended for use to perform detection.

Now, beyond the mere detection of optical properties of particles, the present device 100 can be used to perform characterization. Indeed, by integrating a subwavelength defect into the microcavity that allows strong optical lateral confinement, a single or few nanoparticle(s) can be trapped electrostatically, so as to perform spectroscopy, e.g., infrared (IR) spectroscopy or Raman spectroscopy. Moreover, plasmon-enhanced Raman spectroscopy can be contemplated, e.g., by adding gold nanoparticles as additionally trapped particles. All the more, an appealing feature of the present cavity design is that the height h of spacer may possibly be adjusted, as in embodiments. This way, a desired Raman transition can be chosen by tuning the cavity height h. For completeness, the present device 100 may possibly be integrated into a mobile device.

The precise dimensions of the cavity structure are dictated by the actual application. Several applications can be contemplated, as exemplified above. For example, IR radiation may be needed for performing IR spectroscopy. In Raman scattering, laser radiation with wavelengths in the visible (or near-infrared) region of the spectrum will be utilized, as discussed later in reference to FIG. 3.

All this is now described in detail, in reference to particular embodiments of the invention. To start with, referring more particularly to FIG. 2, the Brownian motor structure 131-134 shall preferably comprise one, two or more (e.g., four) channels 131, 132, 133, 134. And as further seen in FIG. 2, each channel may have a ratchet topography, in particular a rocking ratchet, to enable rocking Brownian motors. That is, the steps of each channel are designed to allow step-by-step, linear motion of a nanoscale particle in only one direction, while preventing motion thereof in the opposite direction. A ratchet as used herein accordingly means a topography that allows or, at least, strongly favors a step-by-step motion in one direction only. Each channel leads to the electrostatic trap 140, so as to be able to load (unload) particles in (from) the trap 140.

Figure 2:
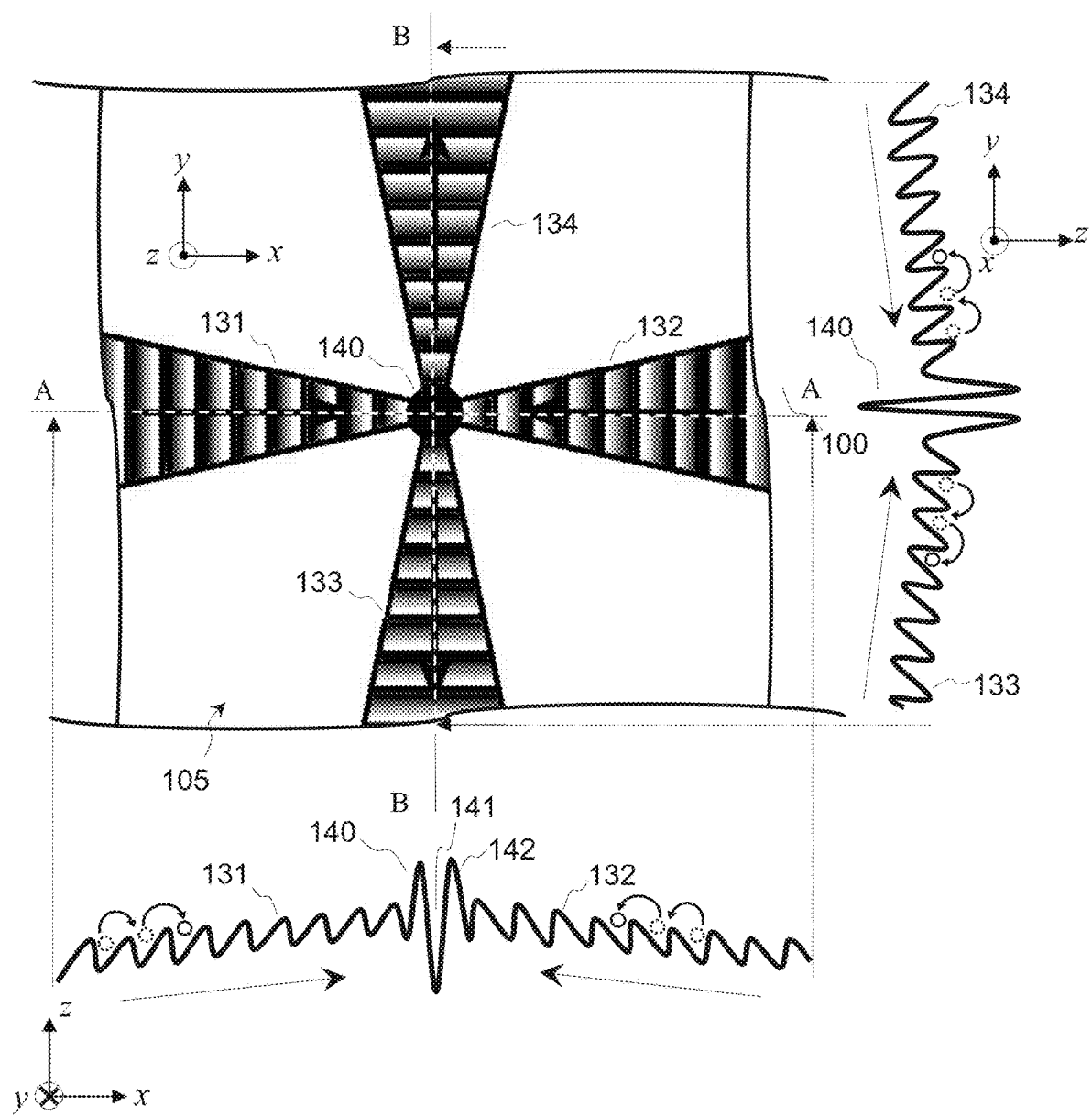
FIG. 2 is a top view of this device, showing details of the Brownian motor structure. The latter comprises four channels leading to a pit of the trap, for reversibly loading particles in the trap, as in embodiments. Preferred profiles of the channels are depicted on the right-hand side and bottom side of the top view.

The channel structure shown in FIG. 2 allows particles to be reversibly loaded. This, practically, can be achieved using different orientations for the steps (the saw teeth) of the channels. In the example of FIG. 2, two types of sawtooth directions are used. Channels 131, 132 have the shallow slope of the teeth facing the trap 140, to urge particles toward the trap, while the teeth of channels 133, 134 are outwardly oriented, to favor the removal of particles. The shallow slope angles of the steps may be more or less pronounced, though it will normally be small (e.g., less than 10°), as made possible with lithographic techniques discussed below.

The channel structure 131-134 shown in FIG. 2 makes it possible to load particles via the horizontal channels 131, 132, while particles can be unloaded via the vertical channels (in the plane (x, y) of the figure). In variants, other means (e.g., microfluidic channels, pumps, etc.) may be involved to flush the trapped particles after detection, in addition to the channels 131-134 or instead of some of these channels.

In the example of FIG. 2, the channels of each of the pairs (131, 132) and (133, 134) are oppositely arranged with respect to the electrostatic trap 140. I.e., the channels 131-134 radially extend from the trap 140, oppositely, and two-by-two, so as to be included in a respective quadrant on the Brownian motor structure surface 105. A number of variants can be contemplated, e.g., relying on only one ratchet (to load the trap), two ratchets (to only load the trap or to both load and unload the trap), three, five, or more ratchets, all distributed around the trap 140.

Preferred ratchet topographies of the channels 131-134 are shown on the right-hand side and the bottom side of the main view (top view) of the Brownian motor structure of FIG. 2. The channels 131-134 are preferably processed so as for a bottom wall 105 to form contiguous steps, to obtain the desired ratchet topography. As seen in FIG. 2, the steps of opposite channels are oppositely oriented along the main directions of the channels. The main direction of a channel is depicted by an arrow under the corresponding sawtooth profile; it extends radially from/up to the trap 140.

The average plane of the bottom wall 105 of each channel typically forms an angle with the reference plane RP. E.g., the bottom wall 105 of the channels may climb from the peripheral region of the Brownian motor structure up the trap 140, so as to progressively modify the effective refractive index in the spacer region (see FIG. 1).

In embodiments such as depicted in FIGS. 1, 2, 4A-D, and 5A-D, the electrostatic trap 140 further includes a ridge 142 surrounding the aperture of the pit 141 of the trap 140. I.e., the profile of the electrostatic trap 140 shows a rim, which will preferably have a rounded profile. The ridge 142 protrudes above the steps of the channels 131-134, with respect to the reference plane RP (see FIG. 1). The ridge 142 borders the pit 141, which itself reaches down to a level below the steps, so as to prevent a trapped particle to inadvertently escape the pit 141. Thus, the electrostatic trap can be regarded as a double defect structure arranged between the mirrors 111, 112, whose profile in the plane perpendicular to the reference plane RP and containing the channel axis (i.e., the plane (x, z) or (y, z) in FIG. 2), first shows, e.g., a bell-shaped (a gaussian-like) ridge 142, and then a pit 141, i.e., a hole, making up the second defect. Plus, the pit 141*e* may itself be structured, to provide distinct trapping positions for the particles, as exemplified in FIG. 5C.

Moreover, the pit 141 of the electrostatic trap 140 will preferably have a depth (measured along the direction z, relative to the rim height) that is larger than the average height of the contiguous steps of the channels, to make it more difficult for trapped particles to escape from the pit 141. In variants, the pit 141*d* may be formed as a through hole breaking through to the other side of the material layer supporting the trap, as illustrated in FIG. 4D.

The ratchets and the trap are advantageously processed from a same material (a substrate). This material may for instance be processed so as to form a continuous bottom wall 105 for each of the channels 131, 132, 133, 134 and the central electrostatic trap elements 141, 142. This material may for instance comprise a thermally sensitive polymer, such as polyphthalaldehyde (PPA). Yet, other materials can be contemplated. In particular, a pattern as initially obtained by thermally patterning PPA may be transferred to another materials, e.g., using dry etching. In general, suitable materials will include oxides that spontaneously charge in contact with water or other polar liquids. A particularly preferred material is silicon oxide, which negatively charge under intermediate pH conditions.

As evoked earlier, an appealing advantage of the present design is that it can be made as a two-part device, allowing the height h of the spacer region R to be adjusted. For instance, and as illustrated in FIG. 1, the two mirrors 111, 112 of the microcavity may be arranged in respective parts 101, 102 of the device 100, where the parts 101, 102 are movable relative to each other along direction z. Thus, the height of the spacer can easily be adjusted, which, in turn, makes it possible to scan the resonance wavelength of the cavity.

The mirrors 111, 112 may for example be distributed Bragg reflectors (DBRs), formed from multiple layers of alternating materials with varying refractive index (preferably as essentially parallel, flat layers), as assumed in the accompanying drawings. I.e., each layer boundary causes a partial reflection of radiation. In variants, one or each of the DBRs may include a defect, e.g., repeated throughout the layers of the DBR, at the level of the trap 140, in addition to the double-defect structure 141, 142 of the trap. In other variants, different types of reflecting mirrors can be contemplated, possibly including a defect.

In all cases, the frontmost surfaces of the two mirrors 111, 112 may be intrinsically negatively charged, electrically. As such, the inner surfaces of the mirrors would be regarded as forming part of the electrostatic trap 140. In variants, additional material layers could be involved (provided they are sufficiently permissive to the target radiation), which would be charged on their inner sides.

In embodiments, the device 100 further includes one or more pairs of electrodes 121, 122, as assumed in FIG. 1. Such electrodes are advantageously integrated in the device 100; they allow the Brownian motor structure 131-134 to be subject to (i.e., powered by) an electro-osmotic flow generated by an AC voltage applied across the electrodes 121, 122. One pair of electrodes can be provided for each channel (or opposite channel pairs, if the latter are suitably oriented, as in FIG. 1). The electrodes can be contacted by electrical traces (not shown) arranged on the device 100. In variants, electrodes may be provided on an external device, to which the device 100 is paired or integrated.

Figure 5A:
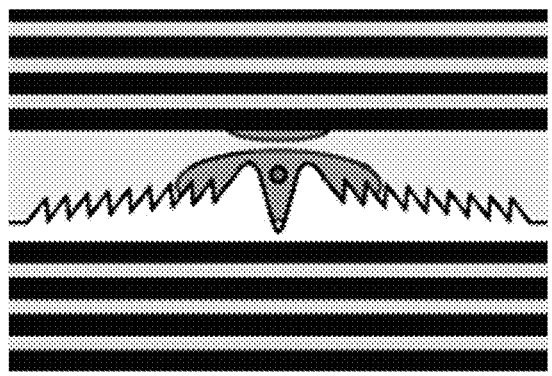
Figure 5B:
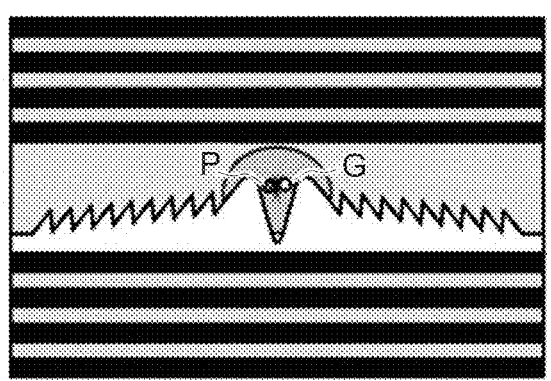
Figure 5C:
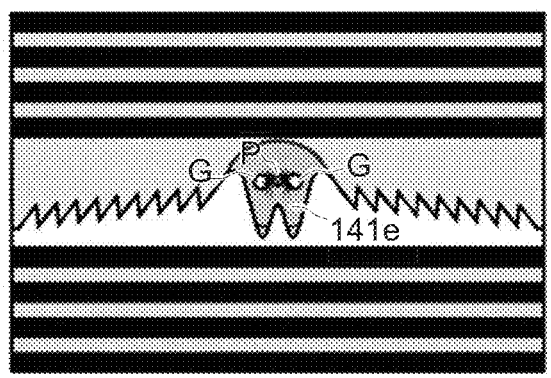
Figure 5D:
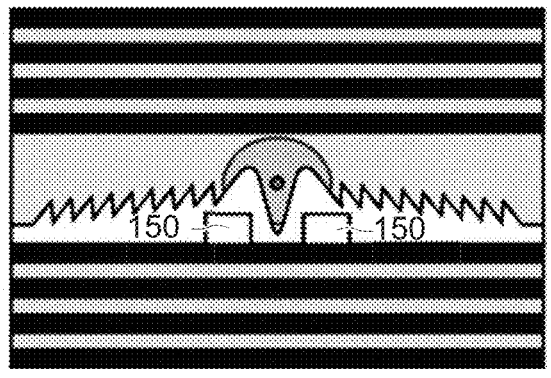

Referring to FIG. 5D, specific applications may further require one or more pairs of antennas 150 (or antenna elements), integrated in the device 100 in the vicinity of the trap 140, to enable surface enhanced spectroscopy (e.g., surface-enhanced Raman, infrared absorption or fluorescence). To that aim, one or more sets of nanoscale plasmonic antennas may additionally be provided, which are designed for electromagnetic field enhancement (FE) and, possibly, electrical biasing. Such sets of antenna elements comprise, each, at least one pair of opposite antennas separated by a gap, which defines a FE volume.

Other applications may require distinct trapping positions (as illustrated in FIG. 5C), in particular in plasmon-enhanced Raman spectroscopy, which can be performed by adding gold nanoparticles G, in addition to analyte particles P.

Figure 3:
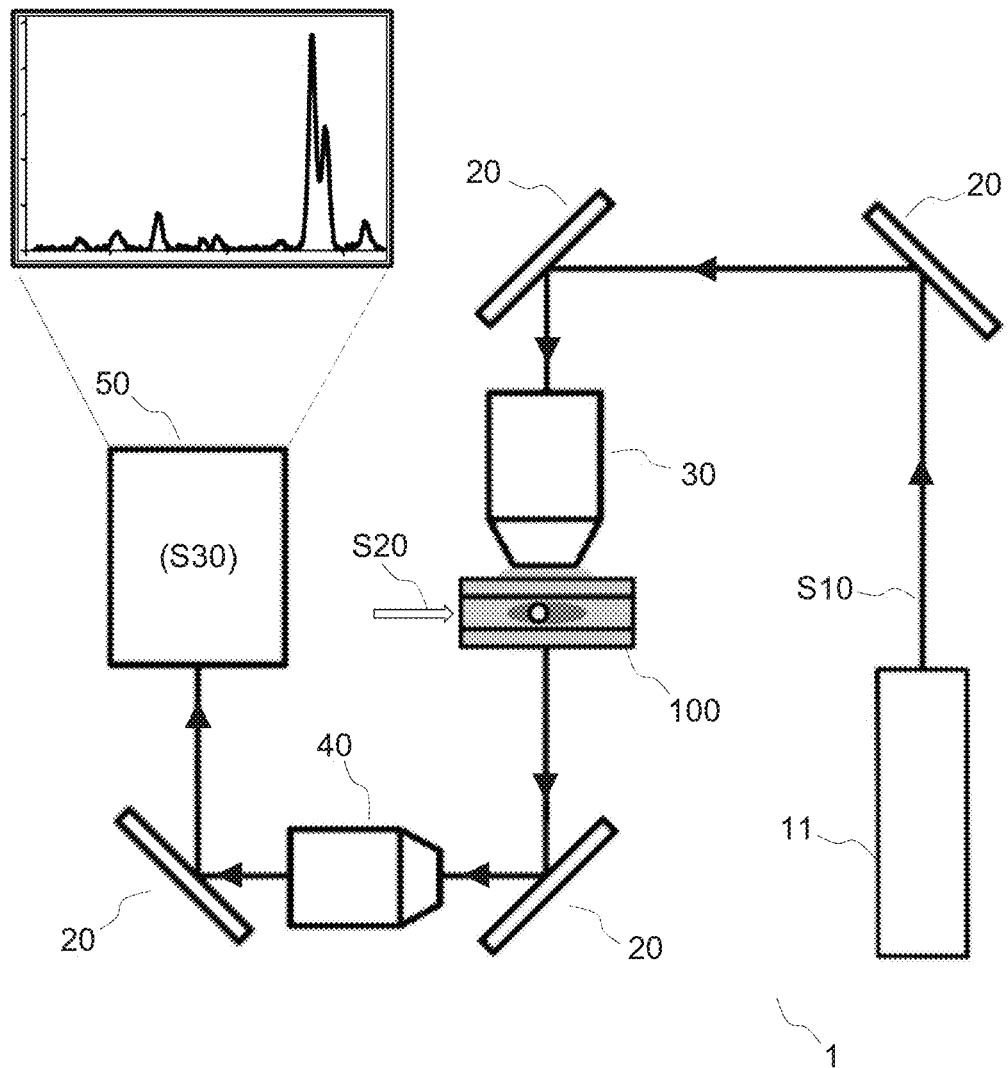
FIG. 3 is a diagram of selected components of a detection apparatus comprising a device such as depicted in FIGS. 1 and 2, according to embodiments.

Referring to FIG. 3, another aspect of the invention is now described, which concerns a detection apparatus 1. The apparatus 1 comprises a detection device 100 such as described above. In addition, the apparatus 1 includes a radiation source 11 for irradiating the microcavity, so as to allow a standing wave to form in the spacer region R, in operation. Moreover, the apparatus 1 is equipped with a detector 50, configured to detect optical properties of particles P trapped in the electrostatic trap 140, in operation. As discussed above, the detection device 100 is preferably designed as a two-part device, to allow the apparatus 1 to scan a resonance wavelength of the microcavity by adjusting the height h of the spacer region R.

This apparatus 1 may notably be configured as a Raman spectrometer. There, the radiation source 11 is used to irradiate the microcavity, so as for radiation that gets confined in the spacer region R to excite particles P trapped in the electrostatic trap 140. Meanwhile, the detector 50 is used to detect photons inelastically scattered by the trapped particles P, in operation.

In preferred embodiments, the apparatus 1 includes a laser source 11 (e.g., a 785 nm laser). The emitted light reaches a high numerical aperture (NA) oil immersion objective 30, before hitting the cavity 100. Photons leaving the cavity are guided to a long working distance objective 40, before reaching the detector 50. The latter is typically coupled to a computerized analysis system (not shown) to help in characterizing the detected properties. And as usual, the set-up may include mirrors (including dichroic mirrors) 20, as well as beam splitters (not shown).

A third and final aspect of the invention concerns particle detection methods, which are now described in reference to FIG. 3. Basically, such methods rely on a detection device 100 and/or an apparatus such as described earlier in reference to FIGS. 1, 3, 4A-D, and 5A-D. For example, the device 100 includes a cavity structure forming a Fabry-Perot optical microcavity, an electrostatic trap 140 in the spacer region R between the mirrors 111, 112 of the cavity, as well as a Brownian motor structure 131-134.

The present methods involve three steps S10, S20, and S30, which may be concomitantly performed, as suggested in FIG. 3. Namely, one or more particles P are loaded S20 in the trap 140 by moving such particles with the Brownian motor 131-134. As discussed above, optical properties of the particle(s) P trapped in the electrostatic trap 140 are detected S30 by irradiating S10 the microcavity to concentrate radiation at the trap 140.

The photons in the cavity interact with the trapped particle(s), which in turn emit photons that can be detected at a detector 50. Now, beyond the mere detection of the presence of certain particles, properties of the trapped particles can be monitored and characterization be performed based on a (very) small number of particles. For example, the microcavity can be irradiated S10 so as for radiation concentrated at the level of trap 140 to excite particles P trapped therein. This interaction process may notably lead to inelastic scattering, which can be detected, as in Raman spectrometry. I.e., in that case, the detected properties are mediated by photons inelastically scattered by the excited particles P.

More generally, various spectroscopy techniques may be conducted on very small quantities of analytes, e.g., in field-enhanced volumes, through optical antennas, as assumed in FIG. 5D. Owing to their dimensions (e.g., with gap ranges between 2 and 20 nm), the field-enhancement volumes formed between opposite antenna elements 150 allow a high concentration of electro-magnetic radiation at the nanoscale.

In addition, the Brownian motor structure makes it possible for analytes to be deterministically funneled to the trap 140, i.e., into the field-enhanced region, where they can be detected, e.g., through surface enhanced spectroscopies (surface-enhanced Raman, infrared absorption or fluorescence) as well as intensity and phase changes based on resonance shifts. As discussed earlier, the particles P can be loaded S20 in the electrostatic trap 140 by subjecting the Brownian motor structure 131-134 to an electro-osmotic flow L generated by one or more AC voltages.

As discussed earlier too, preferred is to rely on a device 100 in which the two mirrors 111, 112 of the microcavity are arranged in respective parts 101, 102 of the device 100, which parts 101, 102 are movable relative to each other with respect to the normal to the reference plane RP (i.e., the direction z). This way, it is possible to scan the resonance wavelength of the microcavity, by moving the parts 101, 102 relative to each other with respect to direction z, in order to adjust the height h of the spacer region R. Scanning the resonance wavelength allows for Raman spectroscopy without additional spectrometer.

The present approach allows for label-free detection and fingerprinting of single nanoparticles allows for a broad range of applications, notably in environmental monitoring, health applications, monitoring of industrial processes, etc.

The above embodiments have been succinctly described in reference to the accompanying drawings and may accommodate a number of variants. Several combinations of the above features may be contemplated. Examples are given in the next section.

2. Specific Embodiments—Technical Implementation Details

This section describes particularly preferred nanosensor designs that allow to reversibly load particles into an electrostatic trap inside an optical microcavity, where they can be spectroscopically analyzed with high sensitivity and specificity.

Such embodiments rely on a tunable cavity structure that forms a Fabry-Perot optical microcavity with a subwavelength deformation 141, which, together with inner material surfaces of the cavity structure, forms a nanofluidic electrostatic trap inside the microcavity. The trap can be loaded and unloaded with nanofluidic, rocked Brownian motors, as illustrated in FIG. 2. A laterally applied oscillating electric field powers the motor. Depending on the orientation of the field, the trap is loaded or unloaded. The nanoparticles are first dispersed in a fluid L (see FIG. 1, e.g., H2O, or any other high-dielectric constant liquid) inside a tunable nanofluidic slit R of height h, which will typically be between 10 and 1 000 nm, in operation.

The Raman scattering of a trapped particle is strongly enhanced due to the Purcell effect in the optical cavity. Plus, scanning of the optical cavity allows Raman spectroscopy to be performed without the need of an additional spectrometer, as discussed in the previous section.

The top and bottom surfaces of the slit are preferably coated, each, with a distributed Bragg reflector (DBR) to form the optical microcavity. The mirror coatings preferably consist, each, of a stack of $Ta_2O_5$ and $SiO_2$ layers, produced by ion beam, magnetron sputtering, and/or evaporation. Other materials with suitable transparency and refractive indices can nevertheless be contemplated, as known per se. The inner dielectric thin film layers are intrinsically negatively charged (e.g., SiO2).

The lateral confinement structure (i.e., the light confining structure 140, 141, 142) of the cavity structure is preferably produced by lithographic fabrication, e.g., using thermal scanning probe lithography or focused ion beam milling. The electrostatic trap pit 141 and the Brownian motor 131-134 are preferably produced by greyscale lithographical methods, e.g., thermal scanning probe lithography. The size of the whole pattern shown in FIG. 2 (top view) is on the order of 25 µm×25 µm (larger structures can nevertheless be obtained). A preferred material is a polymer (PPA), though oxides, or other uniformly charged materials can be used. In general, a high refractive index material will be preferred for enhanced light confinement.

The cavity structure accordingly obtained forms, together with the central nanoscale deformation 140-142, an electrostatic trap pit 141, which can be loaded (and unloaded) with a Brownian motor powered by an AC voltage, as explained in sect. 1. The screening length should be on the same order of magnitude as the height and width of the topographic structures (steps/saw teeth).

Together with the lateral confinement, the subwavelength defect 141 allows a single (or a few) nanoparticle(s) to be electrostatically trapped while performing Raman spectroscopy. Experiments and FDTD simulations conducted by the inventors have shown that a rocking trap 131-142 having profiles such as depicted in FIG. 2 (gaussian-shaped features 141, 42 and sawtooth ratchets 131-134) can be integrated into the confinement structure with substantially no deterioration of performance of the optical microcavity. Such a microcavity can support multiple longitudinal and multiple transversal modes ($t_1 \ldots t_n$), this depending on the geometry. E.g., the $t_1$ mode can be used to amplify the Raman pump radiation and the $t_2$ mode can be used for the outcoupling of anti-stokes scattered light. Tuning between $t_1$ and $t_2$ (which requires to probe different Raman transitions) can be achieved by changing the cavity length: $\Delta\lambda_1 > \Delta\lambda_2$. Note, for the nanoscale defect resonator the cavity length can be set to have only one longitudinal mode. However, several transversal modes (lateral electromagnetic field distribution) are present. The separation in energy between these transversal modes can be adjusted to match both the pump and the anti-stokes. Moreover, plasmon-enhanced Raman spectroscopy can be performed by adding gold nanoparticles G, in addition to analyte particles P, as schematically illustrated in FIGS. 5B and 5C.

A detection device may be provided. The device can include a cavity structure forming a Fabry-Perot optical microcavity, an electrostatic trap, and a Brownian motor. The Fabry-Perot optical microcavity has two mirrors extending on each side of a reference plane in a spacer region between the two mirrors. The mirrors are configured to vertically confine radiation in the spacer region, i.e., with respect to a first direction perpendicular to the reference plane. The electrostatic trap is arranged in the spacer region. The trap includes a pit and the cavity structure is generally configured to confine radiation in the pit, laterally (i.e., with respect to a second direction parallel to the reference plane). Moreover, the Brownian motor structure extends in the spacer region along said reference plane. This structure is adapted to laterally load particles in the pit of the electrostatic trap by moving such particles along the structure, in operation. Related devices, a detection apparatus, as well detection methods relying on such devices can also be provided.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

What is claimed is:

1. A detection device comprising a cavity structure, the latter forming:
   a Fabry-Perot optical microcavity including two mirrors extending on each side of a reference plane in a spacer region between the two mirrors, the latter configured to vertically confine radiation in the spacer region with respect to a first direction perpendicular to the reference plane;
   an electrostatic trap arranged in the spacer region, the trap including a pit, the cavity structure being configured to laterally confine radiation in the pit with respect to a second direction parallel to the reference plane; and
   a Brownian motor structure extending in the spacer region along said reference plane, the Brownian motor structure adapted to laterally load particles in the pit of the electrostatic trap by moving such particles along the structure, in operation.

2. The device according to claim 1, wherein the Brownian motor structure comprises one or more channels, each having a ratchet topography, wherein each channel of the one or more channels leads to the electrostatic trap.

3. The device according to claim 2, wherein said each channel comprises a bottom wall forming several contiguous steps, each having an asymmetric profile along a main direction of said each channel, so as favor a linear motion of a nanoscale particle in only one direction along this main direction.

4. The device according to claim 3, wherein the electrostatic trap further includes a ridge surrounding an aperture of the pit of the trap, wherein the ridge protrudes above the steps of the channels with respect to said reference plane.

5. The device according to claim 3, wherein the pit of the electrostatic trap has a depth that is larger than an average height of said contiguous steps, as measured along the first direction.

6. The device according to claim 3, wherein the Brownian motor structure comprises at least two of said channels, including at least one channel of a first type and at least one channel of a second type, whose asymmetric profiles of steps are so as to allow particles to be laterally loaded in the electrostatic trap via said at least one channel of the first type and unloaded from the electrostatic trap via said at least one channel of the second type.

7. The device according to claim 6, wherein the Brownian motor structure includes a first pair of channels of the first type and a second pair of channels of the second type, wherein channels of each of the first pair and the second pair are oppositely arranged with respect to the electrostatic trap.

8. The device according to claim 3, wherein
the device further comprises a substrate processed so as to form a continuous bottom wall for each of the channels and the electrostatic trap.

9. The device according to claim 1, wherein
the two mirrors of the microcavity are arranged in respective parts of the device, which parts are movable relative to each other along said first direction, so as to allow a height of said spacer region to be adjusted, in operation.

10. The device according to claim 9, wherein
said two mirrors are distributed Bragg reflectors.

11. The device according to claim 9, wherein
frontmost surfaces of said two mirrors are intrinsically negatively charged, electrically.

12. The device according to claim 1, wherein
the device further includes one or more pairs of electrodes, integrated in the device so as to allow the Brownian motor structure to be subject to an electro-osmotic flow generated by one or more AC voltages applied across said one or more pairs of electrodes.

13. The device according to claim 1, wherein
the device further includes one or more pairs of antennas, integrated in the device in the vicinity of the trap so as to enable surface enhanced Raman spectroscopy.

14. A detection apparatus comprising, wherein the apparatus comprises:
a detection device according to claim 1;
a radiation source configured to irradiate the microcavity, so as to allow a standing wave to form in said spacer region; and
a detector configured to detect optical properties of particles trapped in the electrostatic trap.

15. The apparatus according to claim 14, wherein
the apparatus is configured as a Raman spectrometer apparatus, whereby:
  the radiation source is adapted to irradiate the microcavity so as for radiation confined in said spacer region to excite particles trapped in the electrostatic trap; and
  the detector is configured to detect photons inelastically scattered by the trapped particles.

16. The apparatus according to claim 15, wherein
the detection device of the apparatus is a device according to claim 9, whereby the apparatus is configured to scan a resonance wavelength of the microcavity by adjusting the height of said spacer region.

17. A particle detection method, comprising
providing a detection device, the latter including a cavity structure forming: a Fabry-Perot optical microcavity with two mirrors extending on each side of a reference plane in a spacer region between the two mirrors; an electrostatic trap arranged in the spacer region, the trap including a pit; and a Brownian motor structure extending in the spacer region along said reference plane,
loading one or more particles in the electrostatic trap by moving such particles along the Brownian motor structure, and
detecting one or more optical properties of particles trapped in the electrostatic trap by irradiating the microcavity to concentrate radiation at a level of the pit of the trap.

18. The method according to claim 17, wherein
particles are loaded in the electrostatic trap by subjecting the Brownian motor structure to an electro-osmotic flow generated by one or more AC voltages.

19. The method according to claim 18, wherein
in the device provided, the two mirrors of the microcavity are arranged in respective parts of the device, which parts are movable relative to each other with respect to a normal direction perpendicular to the reference plane, and
the method further comprises scanning a resonance wavelength of the microcavity while irradiating it by moving said parts relative to each other with respect to said normal direction to adjust a height of said spacer region.

20. The method according to claim 17, wherein:
the microcavity is irradiated so as for radiation concentrated at the level of the pit of the trap to excite particles trapped therein; and
the detected one or more optical properties are mediated by photons inelastically scattered by the excited particles.

* * * * *